United States Patent
Wilson

[11] Patent Number: 6,111,500
[45] Date of Patent: Aug. 29, 2000

[54] AUTOMATIC BRAKES INITIATED ANNUNCIATOR

[76] Inventor: James Hoover Wilson, 123 Club Villa Dr., Aiken, S.C. 29803

[21] Appl. No.: 09/175,498

[22] Filed: Oct. 20, 1998

[51] Int. Cl.[7] ...................................................... B60Q 1/44
[52] U.S. Cl. ............................ 340/479; 340/464; 340/468
[58] Field of Search .................................... 340/463, 464, 340/466, 467, 468, 469, 479; 307/10.8

[56] References Cited

U.S. PATENT DOCUMENTS

| | | | |
|---|---|---|---|
| 4,403,210 | 9/1983 | Sullivan | 340/479 |
| 4,591,824 | 5/1986 | Lomen | 340/475 |
| 4,651,129 | 3/1987 | Wood et al. | 340/479 |
| 4,663,609 | 5/1987 | Rosario | 340/479 |
| 4,956,633 | 9/1990 | Waterson et al. | 340/471 |
| 4,987,405 | 1/1991 | Jakobowski | 340/479 |
| 4,990,887 | 2/1991 | Lee | 340/479 |
| 5,172,095 | 12/1992 | Scott | 340/479 |
| 5,345,218 | 9/1994 | Woods et al. | 340/479 |
| 5,404,130 | 4/1995 | Lee et al. | 340/479 |
| 5,504,472 | 4/1996 | Wilson | 340/479 |
| 5,565,841 | 10/1996 | Pandohie | 340/479 |
| 5,606,310 | 2/1997 | Egger et al. | 340/479 |
| 5,801,624 | 9/1998 | Tilly et al. | 340/479 |

Primary Examiner—Jeffery A. Hofsass
Assistant Examiner—Van T. Trieu

[57] ABSTRACT

A vehicle safety device designed to increase highway safety by alerting vehicle operators of initial braking of highway traffic with noticeable rapid blinks of the Center High Mounted Stop Lamp (CHMSL). This selective approach in alerting highway traffic of unexpected braking introduces a new realm of brake signaling. A recognizable and higher-plateau vehicular safety signal and it uses an existing brake lamp. Adding to the value of this new vehicle safety device is its unique design. The Automatic Brakes Initiated Annunciator is engineered to be a simple, reliable, and a practical device. It does not include or need; special power supplies or voltage regulators, adjustments, calibration, oscillators or counters, integrated circuits, complicated wiring installation, special installation space, ambient temperature considerations, vibration consideration, complex circuitry, sophisticated or expensive electronic components, and changes in vehicle operation or brake usage. This simple device provides from about one to three seconds of alerting annunciation by rapid blinks of the CHMSL for braking requirements preceded by extended periods of braking inactivity (a minimum of 25 to 85 seconds) and immediately followed by normal brake illumination of the (CHMSL). It automatically prevents more annunciations from occurring by additional braking related to the initial braking requirement. And finally, it indefinitely delays annunciation re-appearance in stop and go traffic, where brake pedal is constantly being applied. A total of seven (7) electronic components do all of the above, one standard 12-volt relay with two normally closed contacts, two capacitors, two resistors, and two diodes.

9 Claims, 1 Drawing Sheet

AUTOMATIC BRAKES INITIATED ANNUNCIATOR

FEDERALLY SPONSORED RESEARCH OR DEVELOPMENT

None (not applicable)

MICROFICHE

None (not applicable)

BACKGROUND OF THE INVENTION

This invention, hereafter referred to as the Alerting Apparatus, relates to vehicle devices designed to further improve the safety of drivers and their vehicles, specifically during visual impairment, unexpected braking of preceding traffic and from the hypnotic like a trance of lengthy mind-numbing highway driving.

Visual vigilance is without question the main requirement in driving any vehicle. Windshields, windshield washers, headlights, tail lights, turning indicator lights, and brake lights including the center high-mounted stop lamp (CHMSL) have been installed to aid in this driving requirement. Brake light "enhancers" in prior art were proposed in a continuing effort to further improve public safety on crowded highways. The following is a list of researched prior art in the field of driving safety and vehicle impacting prevention:

U.S. Pat. No. 4,403,210 issued Sep. 6, 1983 to Patrick O. Sullivan, is a brake light enhancer that involves the left and right turn signal operation and left and right brake lamps and conditionally provides flashing with each brake pedal application. The device includes a timer/pulse generator, a counter and a latch, all involving complex integrated electronics that is costly and increases the probability of circuit failure. This device is not applicable to the CHMSL.

U.S. Pat. No. 4,591,824 issued May 27, 1986 to John H. Lomen, is a combined turning signal and brake light enhancer device requiring selective electronic circuitry that add to the possibility of failure. The CHMSL is not applicable.

U.S. Pat. No. 4,651,129 issued May 17, 1987 to John P. Wood and Richard A. Gray, is a separate and complete light assembly, consisting of three light bulbs, using a plurality of integrated and discrete electronic components, including an oscillator, divider/counter, and gating circuits. This device is also extensively complex and installation is quite extensive. The CHMSL is not applicable.

U.S. Pat. No. 4,663,609 issued May 5, 1987 to George M. Rosario, is a brake light enhancer that provides initial flashing of the brake lights followed by alternate on-off illumination of the brake lights for the duration of each brake pedal application. This enhancer repeats the flashing/blinking sequence with every brake pedal application. This device provides excessive flashing and blinking which could confuse vehicle operators.

U.S. Pat. No. 4,956,633 issued Sep. 11, 1990 to Charles K. Waterson and Richard Vercillo, is a brake light enhancer that works in conjunction with turn signal operation and provides flashing of brake lights each and every time the brake pedal is applied. Confusion would reign or time-consuming decisions would affect vehicle operators. This device does not apply specifically to the CHMSL.

U.S. Pat. No. 4,987,405 issued Jan. 22, 1991 to Walter T. Jakobowski, is a brake light enhancer that uses a transistor as an electronic switch and an oscillator and counter. It provides flashing of the CHMSL followed by a period of constant illumination and then repeating this sequence as long as the brake pedal is applied. Integrated Circuits and solid state components provide two clock functions. This device repeats the cycle of blinking and constant illumination for the length of brake pedal application. It sends a message that a driver ahead of you is applying constant brake pedal and the driver may be stopping, has stopped, or is riding the brake pedal as a foot rest. There is no fail-safe feature and the use of integrated circuitry increases the probability of failure.

U.S. Pat. No. 4,990,887 issued Feb. 5, 1991 to Robert Lee, is a brake light illumination extension device that extends the brake light illumination beyond the period of brake pedal application. This device is a novel brake light system and does not relate to vehicle safety.

U.S. Pat. No. 5,345,218 issued Sep. 6, 1994 to Daniel S. Woods and Robert Stargiotti, is a flashing brake light system utilizing integrated circuitry. Although touted to be less complicated and more reliable than previous art, this device relies on a semiconductor switch to illuminate the brake light. It is gated "on" from a solid state oscillator and timer. All of these are subject to failure, rendering the center high-mounted stop lamp inoperative. Most solid state circuits are heat sensitive and with excessive intrinsic and/or ambient temperatures, they experience unstable operation and become damaged or totally useless. This device has no failsafe feature.

U.S. Pat. No. 5,404,130 issued Apr. 4, 1995 to Dong H. Lee, Myung H. Lee, and Hea Soon Lee, is a sudden-stop brake-light warning system that utilizes a "mercury" switch, and integrated circuitry. A solid state rectifier, multivibrator, and transistor pulses a relay. This device provides continuous pulsing of the brake lights while the "mercury" switch remains closed. This device would not function in normal braking requirements and uses an undesired element for public usage in the switch used. Device is not designed for accident prevention during normal vehicle operation. Again, integrated circuitry and associated components render this device to be more failure prone.

U.S. Pat. No. 5,565,841 issued Oct. 15, 1996 to Sobas R. Pandohie, is a brake light enhancer. The brake switch illumination voltage for all brake lamps, left, right, and center, is interrupted by contacts of a relay energizing and dependent on a multitude of solid state components, requiring voltage directly from the vehicle battery for a five volt regulated power supply, and the use of an existing vehicle flasher unit.

This device interrupts the brake switch illumination voltage wire connection for all brake lamps and routes this main brake lamp illuminating voltage through pins of a detachable connector, through closed contacts of a relay, through another set of pins of the same detachable connector, and then to the left, right and center brake lamps. In this invention, the re-routing of the illumination voltage for all of the existing braking indicator lamps, inserts a potential threat to safe vehicular operation, by the possible loss of illumination voltage to all of the vehicles braking lamps. Normal and varying vibrations with abrupt movements in an operating vehicle can create the loss of all brake lamp illumination to all braking indicator lamps, by the detachable connector becoming disconnected. Either of the two friction connected pins within the detachable connector can become sufficiently oxidized on their surfaces to prevent passage of the illumination voltage. Also, relay contacts are commonly known to become oxidized and blackened on their surfaces, preventing or altering voltage passage.

This device uses around twenty solid state integrated circuits all are energized constantly during vehicle operation. This high number of active integrated circuits greatly increases potential component failure. These circuits require a five volt regulated power supply which, is connected directly to the vehicle battery, without a protection fuse. A short to battery ground occurring in this invention could start a vehicle fire, before the overheated battery connection burns open.

All above cited prior art satisfactorily achieve the purpose of the invention, however, prior art has not provided an invention that produces "brakes initiated" brake lamp annunciations specifically designed for the existing center brake lamp operation without using or compromising wiring circuits for other braking lamps or vehicle systems, and allowing prevents a subsequent "brakes initiated" brake lamp annunciation to the center brake lamp until the expiration of a previous annunciation time lapse, that was extendable by related subsequent braking, thus producing brakes initiated annunciations, without using direct vehicle battery voltage, detachable connectors, voltage regulators, complex integrated circuits, logic circuits, and using only the center brake lamp illumination voltage on the dedicated wire connection specifically connected to the center brake lamp as the operating voltage source for seven discrete components, and with invention failure the center brake lamp would continue to normally operate, and if the operating voltage source became disconnected, only the center brake lamp would be disabled, not other vehicle brake lamps.

BRIEF SUMMARY OF THE INVENTION

Accordingly, the major object of the Alerting Apparatus is to provide instant initial braking annunciations of only the center high mounted stop lamp (CHMSL) for infrequent vehicular braking applications. It is a very marketable vehicle safety device, appealing to the driving public and to the automotive industry.

Objects and advantages of the Alerting Apparatus are realistic and acceptable approaches for enhancing the visual acuity and vigilance of vehicle operators in dangerous driving situations. Initial braking (application of brakes after a driving period of non-braking) of a vehicle is intentionally applied deceleration with a magnitude determined by the driver. What motivated the driver to alter vehicle velocity is not important. What is important is deceleration was initiated and it can be a crucial signal to following traffic. Initial braking can be the beginning of an accident avoidance maneuver. Therefore, in this light, initial braking should be announced, "annunciated," to alert following traffic of a potential traffic hazard. The most critical usage of initiating brakes is to avoid an accident. It is just as important to annunciate unexpected brake initiation when pulling over to the shoulder of the highway. In this circumstance, following traffic may be caught off guard, resulting in possible collisions.

The Alerting Apparatus emphasizes and annunciates "initial braking." Excessive and repeated flashing of brake lights in prior art veils the intent of brake light enhancers. The highway safety goal of the CHMSL is to improve visual detection of braking vehicles. However, the CHMSL tends to blend with the many other red lights in congested traffic. Some vehicle operators develop blank mindedness or a state of being visually mesmerized after lengthy and tedious driving. Sometimes drivers become deeply engrossed in thoughts unrelated to driving conditions. In almost all driving conditions the majority of drivers immediately notice rapidly flashing lights within their view. These lights mentally alert all drivers. The instant brakes are initially applied, the Alerting Apparatus alerts vehicle operators that a new braking need has been initiated. The Alerting apparatus is designed for the following combination of advantages:

1. To produce an immediate visual annunciation when the vehicle brake pedal is initially applied (after a prolonged period of non-use).
2. To use the center high mounted stop lamp (CHMSL) and its specific illumination voltage as the sole means for visually annunciating the initial brake pedal.
3. To provide annunciations for approximately one to three seconds in duration.
4. To produce, during the annunciation period, from approximately two to fourteen blinks of the CHMSL.
5. To have normal illumination of the CHMSL during an annunciation reset period.
6. To produce a reset period determined by the length of the initial brake pedal and subsequent related brake pedal applications.
7. To extend the initial brake pedal reset period indefinitely with frequent brake pedal applications.
8. To limit consequences of unexpected apparatus failures as follows:
    a. an annunciating circuit component failure will leave the center brake lamp with normal illumination.
    b. a disconnection of the illumination voltage source to the annunciating circuit will disable the CHMSL, but the remaining left and right brake lamps will still operate.
    c. an annunciating circuit short of the illumination voltage to vehicle battery ground will not be a vehicle fire hazard because of the vehicle fuse to the brake system.
9. To provided the above features with basic analog electronic circuitry using seven standard discrete electronic components powered by CHMSL illumination voltage.
10. To operate entirely without integrated circuits, oscillators, timers, or special power supplies.
11. To provide an operating system totally independent of adjustments.
12. To use totally passive electronic circuit components that perform by charging and discharging to the presence of CHMSL illumination voltage.
13. To provide all of the above features without compromising any vehicle operating device including undisturbed left side and right side brake lamps.
14. To provide an easily installed small device with three wire connections.

Figure 1:
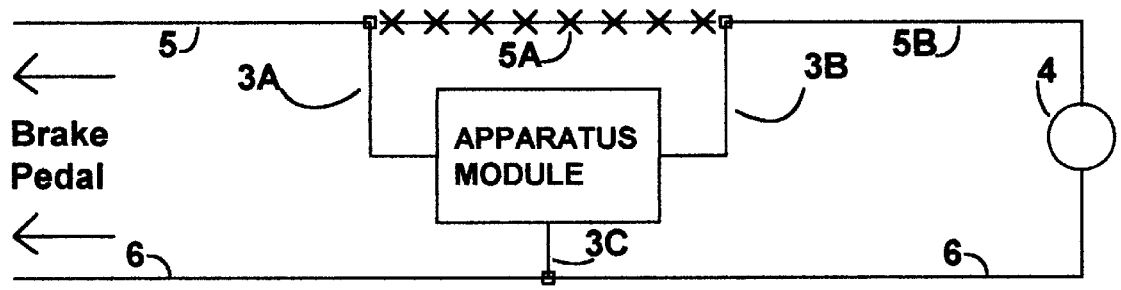
FIG. 1 shows the Alerting Apparatus module inserted into the existing center high mounted stop lamp (CHMSL) 4 illumination voltage source wiring connections.
Figure 2:
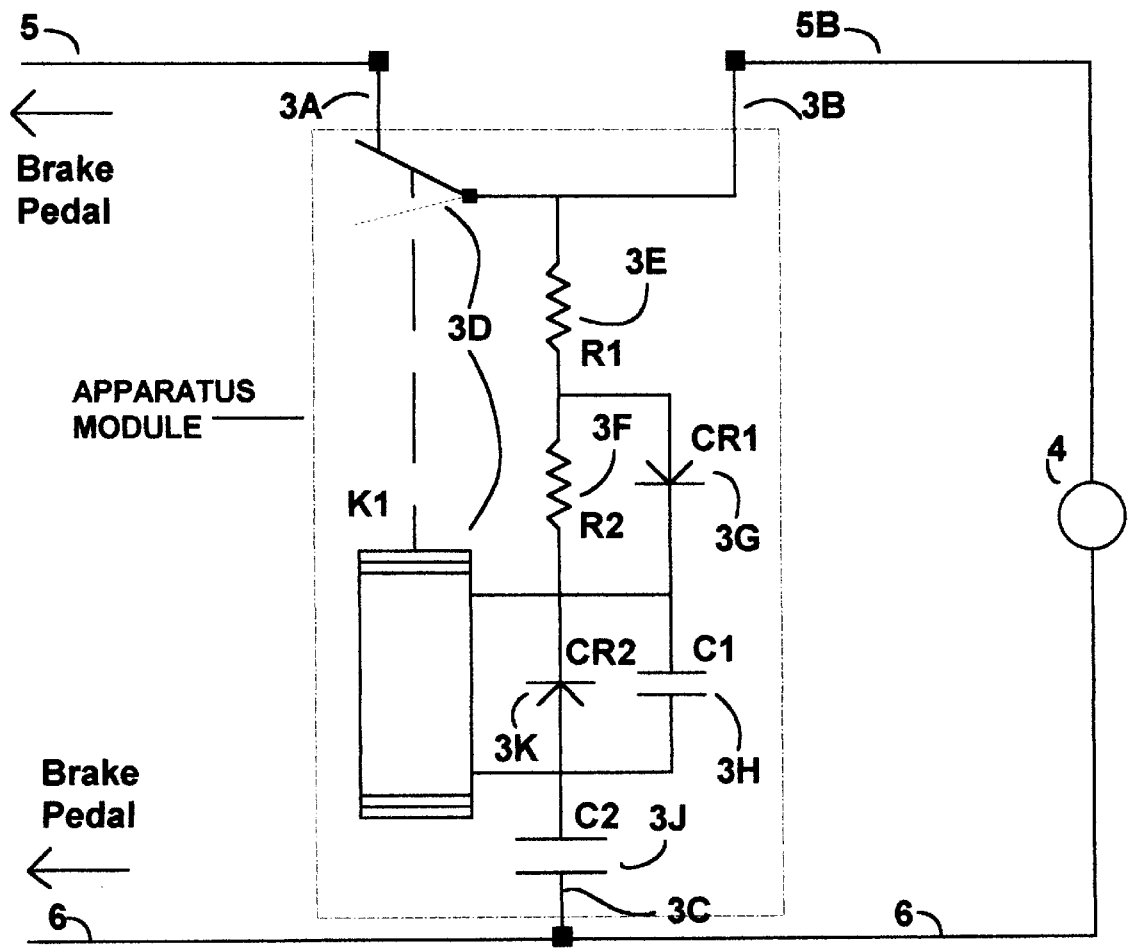
FIG. 2 shows the circuitry and electronic component parts of the Alerting Apparatus module.

Reference Numerals in Drawings are defined as follows:
3A Module wire that connects to wire 5 (FIGS. 1,2).
3B Module wire that connects to wire SB (FIGS. 1,2).
3C Module wire that connects to ground wire 6 (FIGS. 1,2).

3D Module relay K1, blinker relay with normally-closed contacts (FIG. 2).
3E Module charge/discharge resistor R1 (FIG. 2).
3F Module discharge resistor R2 (FIG. 2).
3G Module charge diode CR1 (FIG. 2).
3H Module blinker capacitor C1 (FIG. 2).
3J Module stop/reset capacitor C2 (FIG. 2).
3K Module discharge diode CR2 (FIG. 2).
4 CHMSL, illuminated by wire 5B (FIGS. 1,2).
5 Wire specifically providing brake pedal illumination voltage for CHMSL 4 (FIGS. 1,2).
5A Removed portion of wire 5 (FIG. 1).
5B Wire connecting brake pedal illumination voltage to CHMSL 4 (FIGS. 1,2).
6 Ground wire for CHMSL 4 (FIGS. 1,2).

DETAILED DESCRIPTION OF THE INVENTION

Compared with prior art, the Alerting Apparatus is an overwhelming improvement. The Alerting Apparatus is a simple device designed without any microprocessors, micro controllers, crystals, oscillators, integrated circuits, transistors, or special power supply. Simplicity reigns and so does low construction costs. Problems with extreme heat and cold, excessive vibration, signal radiation, and interference with other electric/electronic equipment are unlikely. It is selectively installed into the wiring specifically dedicated to the vehicle's center high mounted stop lamp (CHMSL), avoiding any wiring to the left side and right side brake lamps, thus leaving braking illumination intact for these remaining brake lamps in case the apparatus becomes inoperative.

In FIG. 1 a simplified drawing displays the Alerting Apparatus module inserted into the wire connection, from the brake pedal, providing illumination voltage specifically to CHMSL 4. The module is approximately 2×2×3 inches in size with three (3) module connection wires 3A, 3B, and 3C. Brake pedal wire 5 is connected to module wire 3A and module wire 3B is connected to wire 5B. The module therefore replaces the opened wire connection 5A. The third module wire 3C is attached to the ground wire 6 that is connected to CHMSL 4.

In FIG. 2 the internal circuitry of the module is displayed in schematic form. Brake pedal illumination voltage for CHMSL 4 is connected from wire 5, to wire 3A, through normally closed contacts of blinker relay 3D, to wire 3B, and to wire 5B that is connected to CHMSL 4. Thus, if blinker relay 3D as unable to energize because of a module circuit malfunction, normal CHMSL 4 illumination would still occur through the normally-closed contacts of blinker relay 3D. The possibility of stop/reset capacitor 3J shorting and energizing relay 3D is extremely remote. When initial braking occurs (an application of brakes after a prolonged period of non-braking), CHMSL 4 is instantly illuminated by illumination voltage appearing on wire 5, wire 3A, through closed contacts of blinker relay 3D, to wire 3B, and to wire 5B connected to CHMSL 4, however the illumination voltage path is repeatedly interrupted by contacts of blinker relay 3D, that start intermittently opening, creating a blinking annunciation of CHMSL 4. This annunciation ends when a stop/reset capacitor 3J finally charges to a threshold voltage that leaves insufficient illumination voltage to charge a series connected blinker capacitor 3D for continued intermittent energizing and de-energizing. Connected across blinker capacitor 3H is a blinker relay 3D that energizes whenever the voltage charge across blinker capacitor 3H reaches a voltage level sufficient enough to energize blinker relay 3D. CHMSL 4 returns to normal illumination through the normally closed contacts of the disabled blinker relay 3D, and CHMSL 4 remains constantly illuminated for the remaining length of the initial brake pedal application. Follow-up brake pedal applications related to the initial braking action cannot produce another annunciation because of the remaining voltage charge on stop/reset capacitor 3J.

The Alerting Apparatus has three functions: the initial variable annunciator (initial instant blinking periods); the annunciation stop/reset (stops and resets initial annunciations); and the brake pedal priority (extends the reset interval between initial annunciations). The initial variable annunciator function:

Reference FIG. 2, the initial variable annunciator function provides instant blinking only after a stop/reset capacitor 3J has discharged below a threshold voltage level. Assuming that stop/reset capacitor 3J has totally discharged all previously charged illumination voltage, a maximum length of an initial annunciation, around three seconds consisting of about fourteen blinks of CHMSL 4, will be produced with a brake pedal application. Applying brake pedal sends illumination voltage to wire 5, to wire 3A, to normally-closed contacts of blinker relay 3D, to wire 3B, and to wire 5B illuminating CHMSL 4. Series connected stop/reset capacitor 3J and blinker capacitor 3H start charging toward the CHMSL 4 illumination voltage with charging current flowing from ground wire 6, through stop/reset capacitor 3J, through blinker capacitor 3H and paralleled blinker relay 3D, through charge diode 3G, through charge/discharge resistor 3E, through normally-closed contacts of blinker relay 3D, through wire 3A, and finally to wire 5 that is providing the illumination voltage. Blinker relay 3D is briefly bypassed by paralleled blinker capacitor 3H that is charging toward the illumination voltage. Discharge diode 3K is like an open circuit to charging current flow. Charge diode 3G is like a short circuit to charging current, therefore charging current bypasses discharge resistor 3F. The charge/discharge resistor 3E is the only resistor to affect the charging times of stop/reset capacitor 3J and blinker capacitor 3H. Stop/reset capacitor 3J and blinker capacitor 3H are like two batteries in series and charging to the illumination voltage through resistor 3E. As the charging voltage on blinker capacitor 3H increases toward the illumination voltage, it reaches a voltage level large enough to energize blinker relay 3D, that is connected in parallel with blinker capacitor 3H. When relay 3D energizes, it opens its normally-closed contacts, thus removing the illumination voltage to the module and to CHMSL 4. With the removal of illumination voltage, blinker capacitor 3H starts discharging its charge voltage through blinker relay 3D, continuing to keep it energized for a short period of time when decreasing voltage on blinker capacitor 3H becomes too low to keep relay 3D energized. When blinker relay 3D de-energizes, its contacts return to normally-closed, reconnecting the illumination voltage and restarting the cycle just described. However, during each of these cycles, stop/reset capacitor 3J has been charging toward the intermittent illumination voltage. After about fourteen (14) cycles and approximately three (3) seconds of time, the amount of illumination voltage charged, and stored, in stop/reset capacitor 3J reaches a threshold voltage level that leaves the balance of illumination voltage to be insufficient for blinker capacitor 3H to charge to and energize blinker relay 3D. With blinker relay 3D no longer able to energize, the longest initial annunciation feature of the module ends. CHMSL 4 no longer blinks but remains constantly illuminated with the presence of its brake pedal illumination voltage connected through the normally closed contacts of blinker relay 3D.

Assuming that discharging stop/reset capacitor 3J has discharged its stored voltage to a level, just below the threshold voltage level, leaving just enough remaining illumination voltage for blinker capacitor 3H to charge to and energize blinker relay 3D, and brake pedal is applied. In this instance, the shortest period of initial variable annunciation will occur. Blinker capacitor 3H and blinker relay 3D will only be able to produce a minimal number of blinking cycles before still partially charged stop/reset capacitor charges again to the threshold voltage level, thus once again stopping annunciation.

Therefore, initial annunciations are variable and can range from about one second with two blinks to three seconds with fourteen blinks of the CHMSL 4, depending on how much discharging voltage remains on stop/reset capacitor 3J when brake pedal is later applied. When stop/reset capacitor 3J has stopped the annunciator, the annunciator stop/reset function begins. The annunciator stop/reset function:

In the annunciator stop/reset function, stop/reset capacitor 3J has charged to the threshold voltage in a maximum charge time of approximately three seconds and has stopped the initial variable annunciations. The threshold voltage level deprived series connected blinker capacitor 3H with sufficient remaining voltage to energize blinker relay 3D and while the original brake pedal remains applied, CHMSL 4 stays constantly illuminated and stop/reset capacitor 3J continues to charge toward the illumination voltage.

The voltage charge on stop/reset capacitor 3J, in three seconds will reach the threshold voltage level, a voltage amount that produces a reset period of about twenty-five seconds. Continued initial brake pedal for about five seconds will produce a reset period of around thirty-five seconds, and with ten seconds of initial applied brake pedal, about fifty-five seconds of reset time will occur. The reset time is the length of time for stop/reset capacitor 3J to discharge to zero voltage.

Stop/reset capacitor 3J discharges slowly during the reset period. The discharge current path is from stop/reset capacitor 3J to wire 3C, to wire 6, through CHMSL 4, to wire 5B, to wire 3B, through charge/discharge resistor 3E, through discharge resistor 3F, (charge diode 3G does not pass any discharging current), through discharge diode 3K (discharge diode 3K is like a short circuit for the discharging current of stop/reset capacitor 3J, bypassing relay 3D winding and blinker capacitor 3H), and to the opposite side of stop/reset capacitor 3J.

However, every subsequent brake pedal application occurring before the voltage on discharging stop/reset capacitor 3J drops to below the threshold level, stop/reset capacitor 3J will charge again toward the illumination voltage and the reset time will be further delayed. This delay is the brake pedal priority function. The brake pedal priority function:

Subsequent applications of brake pedal applied in frequent intervals will not produce any initial annunciations. However, each of these subsequent brake applications will cause the discharging stop/reset capacitor 3J to reverse and recharge toward the illumination voltage. The amount of recharged voltage depends on the length of each brake pedal. Therefore, it is possible to indefinitely delay the next annunciation sequence with subsequent brake pedal applications.

Brake pedal priority automatically prevents excessive annunciations that would be a nuisance in stop and go traffic. Brake pedal priority reserves the annunciating of the CHMSL 4 for announcing new braking requirements in traffic. Thus, the title "Automatic Brakes Initiated Annunciator."

CONCLUSION, RAMIFICATIONS, AND SCOPE OF INVENTION

Comprehensibly, the reader can see the vastly improved construction and design of this vehicle safety device. Compared to the complexity of prior art, this device performs outstandingly well with only the seven (7) standard electronic components. It automatically and repeatedly performs the three functions of initial variable annunciating, annunciation stop/reset, and the brake pedal priority. It does not require any special battery connections, excessive wiring connections, complex integrated circuits, or printed circuit boards. It operates specifically for the center high mounted stop lamp (CHMSL) and is powered using only the illumination voltage wired to the CHMSL without compromising remaining left and right brake lamp operation or other vehicular systems.

The phenomenon of instantly recovering visual acuity and mental alertness with the appearance of rapidly blinking red lights, is put to full use with this simple safety device. Excessive blinking is kept to a minimum. The Alerting Apparatus alerts traffic of braking activity during times of unexpected braking needs. The normal operation of the CHMSL 4 is not affected if the Alerting apparatus fails to operate.

Construction requires no special connectors, printed circuit boards, or special voltages. Installation involves connecting three wires. The device is small enough to be placed almost anywhere, without requiring planned installation space. Production of this device would be a fraction of the cost for prior art.

Although the description above contains many specificities, these should not be construed as limiting the scope of the invention but as merely providing illustrations of some of the presently preferred embodiments of this invention. For example, the stop/reset capacitor 3J, FIG. 2 can be removed and replaced with a direct wire instead. Without stop/reset capacitor 3J, this device becomes a continuous blinker, operating with presence of the applied battery voltage, or any other applied 12 VDC source. In this embodiment, the blinker provides rapid flashing of any light or lights from any switchable (on-off) voltage source providing rapid blinking with very minimal power drain.

Although the above additional embodiments of this invention have been described above by way of example, it will be understood that modifications may be made to the disclosed embodiments which are within the scope of the invention as defined by the appended claims.

The Alerting Apparatus is a very practical, reliable, and a simplistic safety device. It stimulates the attention and visual diligence of vehicle operators. Prior to the inception of the automatic braking system (ABS), many thousands of motorists would briefly "pump" the brake pedal, flashing their brake lights, before applying their brakes. They were alerting following traffic of brake initiation, to prevent a possible accident. Pumping the brake peddle will disrupt and possibly disable ABS braking systems and motorists are therefore warned to stop this intentional practice. The Alerting Apparatus returns this previously established intention, without infringing on the ABS. Safety devices are implemented when they definitely contribute toward accident prevention. Practical and easy to apply safety devices are readily accepted. The Alerting Apparatus has all of these desirable qualities.

I claim:

1. An apparatus that uses a center high mounted stop lamp and its specifically wired illumination voltage to automatically alert vehicular traffic that a new braking requirement has been initiated, comprising:

a. a module that performs using only analog components, with
   b. said module connected to the illumination voltage from the dedicated wire connection specifically sent to said stop lamp, as an operating voltage source, with
   c. said module containing no more than seven passive electronic components, and
   d. said electronic components reacting directly to the presence of said illumination voltage in performing all operations, and
   e. alerting with instant variable annunciations of said stop lamp when a brake pedal application is initiated after lengthy periods of braking inactivity, and providing
   f. automatic prevention of another of said instant variable annunciations, by follow up brake pedal applications, including an
   g. indefinite delay of another of said instant variable annunciations by unrelated, but frequent braking activity, and
   h. allowing normal illumination of said stop lamp when said annunciations are not occurring or if module is disabled, and
   i. increased operational reliability by using seven discrete said electronic components using only said illumination voltage for said stop lamp as the operating voltage source, and without preconditioning said operating voltage source, with said components presenting no intrusion of, or compromising, any other electrical system, including other brake lamp illuminating wiring and associated illuminating voltages, and said components are less sensitive to environmental hazards, avoiding the failure potential of integrated circuits, and whereby
   j. said components use said voltage source which is present only during brake pedal usage, to charge capacitors for a brief period of time, thus a power drain of said apparatus is extremely low, further adding to efficiency of said module.

2. The apparatus of claim 1 wherein a module that performs using only analog components, said analog components create and use capacitance voltage charging and capacitance voltage discharging time periods for all alerting operations.

3. The apparatus of claim 1, wherein said module connected to the illumination voltage from the dedicated wire connection specifically sent to said stop lamp, said illumination voltage is connected in a break in said dedicated wire connection, with said illumination voltage wire applied to a connection to said module, and with said stop lamp wire also applied to a second connection to said module, and a third connection from said module to the ground wire connection to said stop lamp.

4. The apparatus of claim 1 wherein said module containing no more than seven passive electronic components, consists of one relay, two resistors, two capacitors, and two diodes.

5. The apparatus of claim 1 wherein said electronic components reacting directly to the presence of said illumination voltage in performing all operations, accomplish said operations without preconditioning said illumination voltage that is used to react with resistors and capacitors providing different analog charging and discharging rates resulting in an intermittent electromechanical illumination of said stop lamp, by a blinker relay in combination with a paralleled blinker capacitor producing annunciation blinks.

6. The apparatus of claim 1 wherein alerting with instant variable annunciations of said stop lamp when a brake pedal application is initiated after lengthy time periods of braking inactivity, is a circuit function that is automatically controlled by a stop/reset capacitor that stops production of said instant variable annunciations when said stop/reset capacitor is sufficiently charged above a threshold of said illumination voltage provided for said lamp and, only when said stop/reset capacitor nears a complete discharge, can said brake pedal application start charging a blinker capacitor paralleled with a blinker relay, that in turn produce said instant variable annunciations by repeatedly interrupting said illumination voltage with said blinker relay, thus blinking said stop lamp, and with blinking continuing until series connected said stop/reset capacitor becomes sufficiently charged with said illumination voltage, to deny said series blinking capacitor enough remaining said illumination voltage to charge to and energize paralleled said blinker relay, thus stopping said blinking, and leaving said stop lamp normally illuminated for the duration of the initiating said brake pedal application and related brake pedal usage, from which said stop/reset capacitor will continue to charge toward said illumination voltage and may reach a maximum voltage charge, and a maximum voltage charge on said stop/reset capacitor creates the longest period of discharge time for said stop/reset capacitor to fully discharge between said brake pedal applications, thus establishing the basis for long periods of time between said brake pedal applications that activate said instant variable annunciations, and where said instant variable annunciations differ in duration by the number of blinks, which result from initiation of instant variable annunciations when said stop/reset capacitor discharge voltage is between a very low level and completely discharged at the instant said brake pedal applications activate said instant variable annunciations varying from around one second with about two blinks for the most premature initiating said brake pedals, to around three seconds and fourteen blinks for initiating brake pedals occurring after said stop/reset capacitor has fully discharged.

7. The apparatus of claim 1 wherein automatic prevention of another said instant variable annunciations, by follow up brake pedal applications, is accomplished by further charging a stop/reset capacitor with said follow up brake pedal applications thus keeping voltage charged on said stop/reset capacitor above a level that prevents a series connected blinker capacitor to charge to a voltage that energizes its paralleled blinker relay, which produces said annunciation blinks.

8. The apparatus of claim 1 wherein indefinite delay of another of said instant variable annunciations by unrelated, but frequent braking activity, is the perpetuation of discharge time of a stop/reset capacitor, that charges towards illumination voltage during previous said instant variable annunciations, and when said stop/reset capacitor reaches a charged threshold voltage level it stops said instant variable annunciations, and prevents any more said instant variable annunciations until said stop/reset capacitor discharges below said threshold voltage level, however, any application of brake pedal charges said stop/reset capacitor toward said illumination voltage and therefor subsequent said frequent braking activity may fully charge said stop/reset capacitor, thus requiring several minutes to discharge, and additional occasional braking may result in indefinite extension of the discharge time for said stop/reset capacitor.

9. The apparatus in claim 1 wherein, normal illumination of said stop lamp when annunciations are not occurring or if module is disabled, is the result of relay contacts providing series continuity in the in the illumination wiring dedicated specifically to said stop lamp, and said continuity broken by said relay contacts that open and close when a blinker relay is energized by the intermittent discharge of a paralleled blinker capacitor, creating and said annunciations, and during non annunciating periods, continuity is maintained through de energized said relay contacts, and any operational disability occurring in the module that would no longer energize said blinker relay, would leave said relay contacts undisturbed allowing normal illumination of said stop lamp.

* * * * *